UNITED STATES PATENT OFFICE 2,338,230

COMPOSITION OF STYRENE AND A POLYMER

Solomon Caplan, New York, N. Y., and William F. Schaufelberger, Irvington, N. J., assignors to The Harvel Corporation, a corporation of New Jersey No Drawing. Application December 14, 1942, Serial No. 468,984

14 Claims. (Cl. 260—23)

The present invention relates to compositions of matter with styrene and one or more of the liquids derived from the Anacardiaceae family of plants and consisting of cashew nut shell liquid, marking nut shell liquid and Japanese lac. The present invention also relates to novel products and to methods and steps of making the same as well as to applications of the compositions of the present invention.

Styrene $C_6H_5CH:CH_2$ is an oily liquid which at room temperature is soluble in benzol and which will polymerize at room temperature to a solid, metastyrene, which is brittle, has poor dimensional stability characteristics, and is soluble in benzol. One of the outstanding characteristics of solid polymerized styrene, known as metastyrene, is its extremely low power factor loss and constancy of this characteristic over a wide range of temperatures. This electrical characteristic makes polymerized styrene especially suitable as an insulating material. However, in many instances it is not practical to use the same alone because of its high brittleness characteristic particularly in film form, and its cold flow (poor dimensional stability).

Essentially, this invention is directed to the novel methods for as well as the novel products obtained by copolymerizing styrene with other substances which products will have good flexibility, extrudable, low power factor loss and high melting point characteristics.

In the course of our experimentations, we have discovered that the purposes of the present invention are adequately served by a certain type of liquid polymer which may be readily produced. And these polymers, which serve the purpose of this invention, are those liquid polymers produced by heating cashew nut shell liquid, marking nut shell liquid or Japanese lac or any mixture of two or more of them in the presence of a polymerizing agent. These catalytic polymerizing agents are well known and include the mineral acids such as sulphuric acid, hydrochloric acid and phosphoric acid, salts of mineral acids which produce an acid reaction on hydrolysis such as zinc chloride, stannous chloride, phosphorous oxy-chloride and aluminum chloride as well as the alkyl esters such as the alkyl esters of sulphuric acid, such as diethyl sulphate, alkyl esters of phosphoric acid such as tributyl phosphate.

The following Examples 1 to 5 are given as illustrations of the particular methods which may be followed in producing the polymers of cashew nut shell liquid. In place of the cashew nut shell liquid employed in Examples 1 to 5, marking nut shell liquid or Japanese lac may be substituted, and of course the other polymerizing agents may be used in place of the specific ones described therein.

Example 1

| | |
|---|---:|
| Treated cashew nut shell liquid____pounds__ | 200 |
| Concentrated sulphuric acid_____do____ | 3 |
| Alcohol_____gallons__ | 2½ |

The sulphuric acid is dissolved in the alcohol and this solution is added to the cashew nut shell liquid. This mixture is heated while being agitated and the heat supply is temporarily cut off when the mixture has attained a temperature of about 330° F. An exothermic action ensues which will increase the temperature to about 360° F. The mass is held at this temperature of about 360° F. until a sample removed and cooled and then diluted with an equal volume of xylene shows a viscosity at 25° C. of between 40 and 150 centipoises. The mass is then allowed to cool to room temperature. The viscosity of the polymer so produced will generally increase during the cooling period so that its viscosity will be between 50 and 200 centipoises when tested at 25° C. in solution with an equal weight of xylene.

Example 2

| | Pounds |
|---|---:|
| Treated cashew nut shell liquid_____ | 400 |
| Diethyl sulphate_____ | 5 |

The diethyl sulphate is dissolved in the cashew nut shell liquid which is then heated to about 330° F. while being agitated and the heat supply is temporarily cut off when this temperature is reached. An exothermic action ensues which will carry the temperature to about 360° F. The mass is held at this temperature of about 360° F. until a sample removed and cooled and then diluted with an equal volume of xylene shows a viscosity at 25° C. of between 40 and 150 centipoises. The mass is then allowed to cool to room temperature. The viscosity of the liquid polymer so produced will generally increase during the cooling period so that its viscosity will be between 50 and 200 centipoises when tested at 25° C. in solution with an equal weight of xylene.

Example 3

| | Pounds by weight |
|---|---:|
| Cashew nut shell liquid_____ | 400 |
| Concentrated hydrochloric acid (sp. gr. 1.20) | 24 |
| Concentrated sulphuric acid_____ | 1 |
| Water _____ | 15 | which mixture is emulsified by vigorous agitation and then heated under a reflux condenser to about 110° C. for about 2½ hours. The emulsion is then removed to an open kettle and the temperature is increased to 200° C. and held at this temperature until a sample diluted with an equal weight of xylene shows a viscosity at 25° C. of between 40 and 150 centipoises. The mass is then allowed to cool to room temperature. The viscosity of the liquid polymer so produced will generally increase during the cooling period so that its viscosity will be between 50 and 200 centipoises when tested at 25° C. in solution with an equal weight of xylene.

Example 4

Treated cashew nut shell liquid is mixed with about 5% of its weight of tributyl phosphate. The mixture is then heated to 500° F. and held at this temperature until a sample diluted with an equal weight of xylene shows a viscosity at 25° C. of 40 to 150 centipoises. The mass is then allowed to cool to room temperature. The viscosity of the liquid polymer so produced will generally increase during the cooling period so that its viscosity will be between 50 and 200 centipoises when tested at 25° C. in solution with an equal weight of xylene.

Example 5

To treated cashew nut shell liquid is added 10% of its weight of zinc chloride dissolved in an equal weight of alcohol. This mixture is then heated gradually to a temperature of about 350° F. and held at this temperature until a sample diluted with an equal weight of xylene shows at 25° C. a viscosity of 40 to 150 centipoises. The mass is then allowed to cool to room temperature. The viscosity of the liquid polymer so produced will generally increase during the cooling period so that its viscosity will be between 50 and 200 centipoises when tested at 25° C. in solution with an equal weight of xylene.

The following Examples 6, 7 and 8 illustrate the manner of co-polymerizing a solution of styrene and one or more liquid polymers selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between 40 and 200 centipoises.

Example 6

About one part by weight of a polymer made in the manner set forth in either Example 1, 2, 3, 4 or 5 is dissolved in about 10 parts by weight of monomeric styrene. This solution is heated for about 50 hours at 100° C. either under a reflux condenser or in a closed vessel and then it is allowed to cool to room temperature. The product thus obtained is a tough, solid, mass which can be extruded through dies to form tape, strips and other shapes. This resin is of a flexible rubbery nature and has a melting point around 200° C.

Example 7

About 1½ parts by weight of a polymer made in the manner set forth in either Examples 1, 2, 3, 4 or 5 is dissolved in about 10 parts of monomeric styrene. This solution is heated for about 16 hours at about 100° C. either under a reflux condenser or in a closed vessel. Then the mass is allowed to cool. The product so obtained is plastic when hot but when cool is a non-tacky, soft, solid, rubber-like resin, whose melting point is above that of metastyrene. This product can be milled into rubber on rubber mixing rolls.

Example 8

A quantity of a polymer made in the manner set forth in either Example 1, 2, 3, 4 or 5 is dissolved in an equal weight of styrene. This solution is heated for about 20 hours at about 100° C. either under a reflux condenser or in a closed vessel. The resulting product when cold is a plastic, solid mass having a melting point above 200° C. A film of this product when applied to copper wire by means of toluol as a solvent and baked at 130° C. is tough, flexible and is a good insulator. The products of all of the illustrative Examples 6, 7 and 8 are suitable for use as electrical insulation, as protective coatings, as impregnations, moldings and extrusions and are useful in the arts generally.

In Examples 6, 7 and 8, I prefer to employ the polymers of cashew nut shell liquid made in the general examples described in Examples 1 to 5 inclusive. However, it is within the scope of this invention to employ in place of the cashew nut shell liquid polymers so produced, those polymers of marking nut shell liquid and Japanese lac made in accordance with the Examples 1 to 5 inclusive.

Also part of the present invention are the novel methods and novel products obtained with a heat polymerizable drying oil in solutions of styrene and the polymerized cashew nut shell liquid, marking nut shell liquid or Japanese lac which has been carried to such a stage of polymerization by heat in the presence of a polymerizing agent that a solution thereof in an equal weight of xylene has a viscosity of between 40 and 200 centipoises at 25° C. Some of these specific applications thereof are employing said solution of styrene and one or more of said polymerized liquids together with a heat polymerizable drying oil for the production of materials which may be used as coating materials for fabrics, asbestos, metals and the like, impregnating materials for porous, woven or felted bases, asbestos, wood and the like, as an electrical insulation material which may be applied directly to a conductor to be insulated, may be carried by a base and may be used to fill the space between sheathed cable for the same purpose.

Said solutions of styrene and said polymerizing liquids may have added thereto a heat polymerizable drying oil, such as China-wood oil, oiticica oil and oil obtained from the kernel of the Bangar nut (Sterculia foetida). All of these oils are capable of being polymerized by heat to a solid infusible state. The proportion of said heat polymerizable drying oil employed is preferably between about 5% and 50% thereof based on the quantity of styrene in said solution. After the heat polymerizable drying oil is added to said solution, the entire mass is stirred so that the heating polymerizable drying oil is uniformly distributed throughout said solution. Then, this mass may be sprayed on to a material to be coated or impregnated thereby, or the material to be coated or impregnated therewith may be dipped in or drawn through said mass which is a liquid. Thereafter, the impregnated or coated base may be heated to a temperature of between about 80° C. and 110° C. to convert said mass to a dry, infusible, rubbery solid which is flexible and is substantially insoluble in benzol. Said liquid mass may be heated by itself to between 80° C. and 110° C. to convert the same from a liquid to a dry infusible, rubbery solid which is flexible, is substantially insoluble in benzol, may be shredded or comminuted, and may be extruded, sheeted and calendered.

Said dry, rubbery, flexible, infusible, solid materials may be readily and easily produced, and the following is given by way of specific example, all parts being given by weight.

*Example 9*

In all the examples herein, where cashew nut shell liquid is specifically set forth, I may substitute marking nut shell liquid or Japanese lac. And in Examples 6 to 8, one of said drying oils may be substituted for the polymer. However, I prefer to employ the polymer with or without the drying oil rather than the drying oil alone with the styrene because the resulting products produced with the polymer being present with styrene have superior strength, alkali resistance and other characteristics when compared with this product in which only the drying oil being present with the styrene.

This application is a continuation in part of my co-pending application 318,134, filed February 9, 1940.

The term "treated cashew nut shell liquid," which has been employed in Examples 1, 2, 4 and 5 refers to a treatment for the reduction in the content of vesicant agent occurring naturally in raw cashew nut shell liquid. Such treatment has been described in detail in the Harvey-Damitz Patent No. 2,128,247. In place of the treated cashew nut shell liquid, the raw or untreated cashew nut shell liquid may be employed for the purposes of this invention.

I claim:

1. The method of producing a solid material comprising heating a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between 40 and 200 centipoises.

2. The method of producing a solid material comprising heating a solution of monomeric styrene and a polymer of cashew nut shell liquid polymerized to such a degree by heat in the presence of a polymerizing agent that a solution thereof with an equal weight of xylene has a viscosity at 25° C. of between 40 and 200 centipoises.

3. The method of producing a solid material comprising heating together a heat polymerizable drying oil and a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between 40 and 200 centipoises.

4. The method of producing a solid material comprising heating together a heat polymerizable drying oil and a solution of monomeric styrene and a polymer of cashew nut shell liquid polymerized to such a degree by heat in the presence of a polymerizing agent that a solution thereof with an equal weight of xylene has a viscosity at 25° C. of between 40 and 200 centipoises.

5. A heat convertible composition of matter comprising a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between 40 and 200 centipoises, said composition of matter adapted to be converted by heat to a solid material whose melting point is as great as that of metastyrene.

6. A heat convertible composition of matter comprising a heat polymerizable drying oil and a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between 40 and 200 centipoises, said composition of matter adapted to be converted by heat to a solid material whose melting point is as great as that of metastyrene.

7. A solid material obtained by heating a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between 40 and 200 centipoises.

8. A solid material obtained by heating a solution of monomeric styrene and a polymer of cashew nut shell liquid polymerized to such a degree by heat in the presence of a polymerizing agent that a solution thereof with an equal weight of xylene has a viscosity at 25° C. of between 40 and 200 centipoises.

9. A solid material obtained by heating together a heat polymerizable drying oil and a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between 40 and 200 centipoises.

10. A solid material obtained by heating together a heat polymerizable drying oil and a solution of monomeric styrene and a polymer of cashew nut shell liquid polymerized to such a degree by heat in the presence of a polymerizing agent that a solution thereof with an equal weight of xylene has a viscosity at 25° C. of between 40 and 200 centipoises.

11. The method of producing a solid material comprising heating together a heat polymerizable drying oil and a solution of monomeric styrene and a polymer selected from the group consisting of cashew nut shell liquid, marking nut shell liquid and Japanese lac polymerized to such a degree by heat in the presence of a polymerizing agent that a solution thereof with an equal weight of xylene has a viscosity at 25° C. of between 40 and 200 centipoises, the ratio of the quantity of said styrene to that of said oil being between about 20 to 1 and 2 to 1.

12. The method of producing a solid material comprising heating together a heat polymerizable drying oil and a solution of monomeric styrene and a polymer of cashew nut shell liquid polymerized to such a degree by heat in the presence of a polymerizing agent that a solution thereof with an equal weight of xylene has a viscosity at 25° C. of between 40 and 200 centipoises, the ratio of the quantity of styrene by weight to that of said oil being between about 20 to 1 and 2 to 1.

13. A solid material obtained by heating together a heat polymerizable drying oil and a solution of monomeric styrene and a polymer selected from the group consisting of cashew nut shell liquid, marking nut shell liquid and Japanese lac, polymerized to such a degree by heat in the presence of a polymerizing agent that a solution thereof with an equal weight of xylene has a viscosity at 25° C. of between 40 and 200 centipoises, the ratio of the quantity of said styrene to that of said oil being between about 20 to 1 and 2 to 1.

14. A solid material obtained by heating together a heat polymerizable drying oil and a solution of monomeric styrene and a polymer of cashew nut shell liquid polymerized to such a degree by heat in the presence of a polymerizing agent that a solution thereof with an equal weight of xylene has a viscosity at 25° C. of between 40 and 200 centipoises, the ratio of the quantity of styrene by weight to that of said oil being between 20 to 1 and 2 to 1.

SOLOMON CAPLAN.
WILLIAM F. SCHAUFELBERGER.